US008730977B2

(12) United States Patent
Siemens et al.

(10) Patent No.: US 8,730,977 B2
(45) Date of Patent: May 20, 2014

(54) METHOD OF TRANSFERRING DATA BETWEEN A SENDING STATION IN A FIRST NETWORK AND A RECEIVING STATION IN A SECOND NETWORK, AND APPARATUS FOR CONTROLLING THE COMMUNICATION BETWEEN THE SENDING STATION IN THE FIRST NETWORK AND THE RECEIVING STATION IN THE SECOND NETWORK

(75) Inventors: Eduard Siemens, Sehnde (DE); Stefan Kubsch, Hohnhorst (DE); Jens Brocke, Laatzen (DE); Ralf Koehler, Hannover (DE); Andreas Matthias Aust, Hannover (DE); Frank Glaeser, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 333 days.

(21) Appl. No.: 11/809,483

(22) Filed: Jun. 1, 2007

(65) Prior Publication Data

US 2008/0013557 A1    Jan. 17, 2008

(30) Foreign Application Priority Data

Jun. 12, 2006 (EP) .................................... 06115312

(51) Int. Cl.
*H04L 12/28* (2006.01)
*H04L 12/56* (2011.01)
*H04J 3/16* (2006.01)
*H04J 3/22* (2006.01)
*H04L 12/66* (2006.01)

(52) U.S. Cl.
CPC ............ *H04L 47/2491* (2013.01); *H04L 12/66* (2013.01); *H04L 45/50* (2013.01)
USPC ......................................... 370/401; 370/467

(58) Field of Classification Search
CPC ................ H04L 12/5689; H04L 12/66; H04L 29/06068; H04L 45/50; H04L 47/2491
USPC ............. 370/395.21, 397, 466–467, 400–405
See application file for complete search history.

(56) References Cited

U.S. PATENT DOCUMENTS 6,765,927 B1    7/2004  Martin et al.
6,977,932 B1 *  12/2005  Hauck ........................... 370/392
(Continued)

FOREIGN PATENT DOCUMENTS

WO       WO02/37869 A2    5/2002

OTHER PUBLICATIONS

Marchese et al., MPLS-based QoS Inter-working among Wide Area Subsystems, Oct. 2005, fig. 1,2, 4-6, 9 and pp. 1, 3-5.*

(Continued)

*Primary Examiner* — Un C Cho
*Assistant Examiner* — Jeremy Costin
(74) *Attorney, Agent, or Firm* — Tutunjian & Bitetto, P.C.

(57) ABSTRACT

The invention relates to the field of network communication in a wide area, where a local network of a first type has a sending station that communicates with a receiving station in a local network of a second type. A network of a third type is in between the two networks and provides virtual private networking between the two local networks. The network of the first type supports a fine grained QoS, whereas the network of the third type supports a coarser grained QoS. In one example the network of the first type is RSVP capable and the network of the second type is an MPLS network.
The invention resides in a component called RSVP-MPLS proxy that maps the RSVP resource advertisements and reservations within an RSVP-aware customer network to an MPLS network, whereby the receiver side doesn't participate in the RSVP communication process.

14 Claims, 7 Drawing Sheets

(56) References Cited

U.S. PATENT DOCUMENTS

| | | | |
|---|---|---|---|
| 7,298,750 B2* | 11/2007 | Chen et al. | 370/401 |
| 7,477,657 B1* | 1/2009 | Murphy et al. | 370/468 |
| 2002/0133600 A1* | 9/2002 | Williams et al. | 709/228 |
| 2002/0165978 A1* | 11/2002 | Chui | 709/238 |
| 2003/0118053 A1* | 6/2003 | Edsall et al. | 370/474 |
| 2004/0008688 A1* | 1/2004 | Matsubara et al. | 370/395.21 |
| 2004/0034683 A1* | 2/2004 | Zhao | 709/201 |
| 2005/0025075 A1* | 2/2005 | Dutt et al. | 370/299 |

OTHER PUBLICATIONS

D. Awduche et al., RFC 3209—RSVP-TE: Extensions to RSVP for LSP Tunnels, Dec. 2001.*

L. Berger, RFC 2379—RSVP over ATM Implementation Guidelines, Aug. 1998.*

R. Braden, RFC 2205—Resource Reservation Protocol (RSVP), Sep. 1997.*

Koodli et al., RFC 3357, One-way Loss Patern Sample Metrics, Aug. 2002, pp. 1-15.*

Bhargava et al., MPLS Proxy Admission Control Definition Implementation Agreement, Oct. 2004, 6.0.0, pp. 1-9.*

Marchese M et. al: "MPLS-Based Qos Interworking Among Wide Area Subsystems" Military Communications Conference, 2005. MILCOM, 2005. IEEE Atlantic City, NJ USA Oct. 17-20, 2005, Piscataway, NJ USA IEEE, Oct. 17, 2005, pp. 1-7, XP010903018 ISBN: 0-7803-9393-7 p. 1; figure 1 p. 3-p. 6; figures 4-9; tables I, II.

Bhargava A., Phelan T.: "MPLS Proxy Admission Control Definition Implementation Agreement" MPLS & Frame Relay Alliance Technical Committee (Online) Oct. 2004, pp. 1-9, XP002404920 http://www.mfaforum.org Retrieved from the Internet : URL:http://www.mfaform.org/tech/mpls-proxy-admission-control-definition-ia.pdf> (retrieved on Oct. 26, 2006) the whole document.

\* cited by examiner

|   | 31 | 24 | 23 | 16 | 15 | 0 |
|---|---|---|---|---|---|---|
| 1 | (a) | reserved | | | Overall length | |
| 2 | (b) | 0 | reserved | | Length of service data | |
| 3 | (c) | | 00 | | Parameter length | |
| 4 | Token Bucket Rate [r] (32-bit IEEE floating point number) | | | | | |
| 5 | Token Bucket Size [b] (32-bit IEEE floating point number) | | | | | |
| 6 | Peak Data Rate [p] (32-bit IEEE floating point number) | | | | | |
| 7 | Minimum Policed Unit [m] (32-bit integer) | | | | | |
| 8 | Maximum Packet Size [M] (32-bit integer) | | | | | |

(a) - Message format version number (0)

(b) - Service header, service number 1 (default/global information)

(c) - Parameter ID, parameter 127 (Token_Bucket_TSpec)

Fig.6

|   | 31 | 24 | 23 | | 16 | 15 | 0 |
|---|---|---|---|---|---|---|---|
| 1 | (a) | | Unused | | | Overall length | |
| 2 | (b) | | 0 | reserved | | Length of service data | |
| 3 | (c) | | | 00 | | Parameter length | |
| 4 | Token Bucket Rate [r] (32-bit IEEE floating point number) ||||||| 
| 5 | Token Bucket Size [b] (32-bit IEEE floating point number) |||||||
| 6 | Peak Data Rate [p] (32-bit IEEE floating point number) |||||||
| 7 | Minimum Policed Unit [m] (32-bit integer) |||||||
| 8 | Maximum Packet size [M] (32-bit integer) |||||||
| 9 | (d) | | | 00 | | Parameter length | |
| 10 | Rate [R] (32-bit IEEE floating point number) |||||||
| 11 | Slack Term [S] (32-bit integer) |||||||

(a) - Message format version number (0)

(b) - Service header, service number (c) - Parameter ID, parameter 127 (Token_Bucket_TSpec)

(d) - Parameter ID, parameter 130 (Guaranteed Service Rspec)

Fig.7

METHOD OF TRANSFERRING DATA BETWEEN A SENDING STATION IN A FIRST NETWORK AND A RECEIVING STATION IN A SECOND NETWORK, AND APPARATUS FOR CONTROLLING THE COMMUNICATION BETWEEN THE SENDING STATION IN THE FIRST NETWORK AND THE RECEIVING STATION IN THE SECOND NETWORK

This application claims the benefit, under 35 U.S.C. §119 of European Patent Application 06115312.8, filed Jun. 12, 2006.

FIELD OF THE INVENTION

The invention relates to the field of network communication in a wide area, where a local network of a first type has a sending station that communicates with a receiving station in a local network of a second type. The stations in the two networks are communicating over a wide area network of a third type providing virtual private networking.

BACKGROUND OF THE INVENTION

For realizing virtual private networks in the Internet, the so called VPN technology has been developed. A virtual private network (VPN) is a private communications network usually used within a company, or by several different companies or organizations, to communicate over a public network. VPN message traffic is carried on public networking infrastructure (e.g. the Internet) using standard (often insecure) protocols, or over a service provider's network providing VPN service guarded by well-defined Service Level Agreement (SLA) between the VPN customer and the VPN service provider.

VPN involves two parts: the protected or "inside" network that provides physical security and administrative security sufficing to protect transmission (sometimes it is not always the case), and a less trustworthy or "outside" network or segment (the Internet). Generally, a firewall sits between a remote user's workstation or client and the host network or server. As the user's client establishes the communication with the firewall, the client may pass authentication data to an authentication service inside the perimeter. A known trusted person, sometimes only when using trusted devices, can be provided with appropriate security privileges to access resources not available to general users.

Many VPN client programs can be configured to require that all IP traffic must pass through a "tunnel" while the VPN is active, for better security. From the user's perspective, this means that while the VPN client is active, all access outside their employer's secure network must pass through the same firewall as would be the case while physically connected to the office Ethernet. This reduces the risk that an attacker might gain access to the secured network by attacking the employee's laptop: to other computers on the employee's home network, or on the public internet, it is as though the machine running the VPN client simply does not exist. Such security is important because other computers local to the network on which the client computer is operating may be untrusted or partially trusted. Even with a home network that is protected from the outside internet by a firewall, people who share a home may be simultaneously working for different employers over their respective VPN connections from the shared home network. Each employer would therefore want to ensure their proprietary data is kept secure, even if another computer in the local network gets infected with malware. And if a travelling employee uses a VPN client from a WiFi access point in a public place, such security is even more important. However, the use of IPX/SPX is one way users might still be able to access local resources.

Tunneling is the transmission of data intended for use only within a private, usually corporate network through a public network in such a way that the routing nodes in the public network are unaware that the transmission is part of a private network. Tunneling is generally done by encapsulating the private network data and protocol information within the public network transmission units so that the private network protocol information appears to the public network as data. Tunneling allows the use of the Internet, which is a public network, to convey data on behalf of a private network.

Within the Internet Engineering Task Force (IETF) there are some working groups involved in adding Quality of Service (QoS) enhancements to the VPN technology. The Integrated Services (IntServ) working group has discussed some tunneling as well as aggregation mechanisms. They are described in the Request for Comments documents RFC2379, RFC2746, RFC2998 and RFC3175.

Speaking about Traffic Engineering and QoS, the Multiprotocol Label Switching (MPLS) networking technology is of great interest. This technology comes with sophisticated Traffic Engineering and QoS support. Also it uses tunneling and fits well to the VPN technology. A dedicated signaling extension to perform Traffic Engineering within MPLS networks has been specified as well [see RFC3209, RFC3630, RFC3107, RFC3212]. Especially operation of Resource Reservation Protocol (RSVP)-controlled IP connections over Differentiated Services (DiffServ) networks and the mapping of these data flows to an appropriate DiffServ codepoint (DSCP) have been described within corresponding documents of the IETF [see RFC2998, RFC3175].

The main disadvantages of those approaches discussed within the IETF are the following:

At least parts of the networks, both at the sending and receiving side, have to be RSVP-aware. RSVP tunneling mechanisms only handle the transmission across an inner part of an IP network—see FIG. 1.

In FIG. 1 reference 10 denotes the Internet. With reference 20 RSVP domains inside the Internet are denoted. Inside the left RSVP domain 20 a sending station 21 is depicted. Inside the right RSVP domain 20 a corresponding receiving station 23 is depicted. The two RSVP domains 20 may be located in different areas in the world. One domain might be in CA USA, whereas the other domain is in Europe, e.g. in England. Both domains belong to two trusts worthy places of an organization or company. For a QoS assurance along the patch, the technique of RSVP tunneling is used. The established tunnel has been labeled with reference number 40 in FIG. 1.

Especially if the sender and receiver reside in different administrative domains and VPN technologies like MPLS are applied to the inner network, the receiver side will often not be required to be RSVP-capable, as the inner network will typically already provide some QoS control, like overprovisioning or statically configured priority queuing mechanisms on behalf of the receiver side according to the QoS capabilities of the receiver side.

RSVP advertises a fine-grained traffic (flow) description, network resources should be reserved for, but network operators are commonly unable to handle a large amount of reservations on such a fine-grained basis or map such fine defined requests to classes of services, appropriately.

Although flow aggregation is considered in RFC2746 and RFC3175, the aggregation model described in those documents is only applicable to RSVP-aware networks.

With the common IntServ/RSVP model, IP connectivity between the sender 21 and the receiver 23 must be existent at the resource reservation time. Only establishment of tunnels using aggregated RSVP, maybe in combination with Diff-Serv, within an IP network on behalf of an RSVP reservation request is specified within the IETF documents.

SUMMARY OF THE INVENTION

Common topologies, not covered by the conventional scenario are RSVP-aware local area networks connected to wide area networks of carriers built using e.g. MPLS technology. The local network at the receiver side is hereby not necessarily an IP based network—it can be built based, for instance, on the Infiniband protocol. In this case it is impossible to set up the communication between the two networks starting with an RSVP request from a sending station.

The invention concerns a method for controlling the communication between the sending station in a network of a first type and the receiving station in a network of a second type. This method involves a step of terminating a signaling connection established inside the first network (20) for controlling data transmission to the receiving station (31) inside the second network (30) on behalf of the receiving station (31).

This enables to set up a connection inside the first network as usual.

In an advantageous embodiment this connection will be extended inside the third network by performing a QoS mapping between the QoS demanded by the sending station and the QoS supported in the third network for data transfers directed to the receiving station. The QoS mapping has the advantage that the receiver side doesn't need to participate in the resource reservation communication process.

This invention also resides in an apparatus for controlling communication between a sending station in a first network and a receiving station in a second network, the first network being designed to have a fine grained QoS method, wherein the first and second network are connected over a third network, the third network being designed to have a coarser grained QoS method than the first network. The apparatus comprises termination means being adapted to terminate a signaling connection established inside the first network (20) for controlling data transmission to the receiving station (31) inside the second network (30) on behalf of the receiving station (31). The apparatus operates as a representative for the receiving station from the network of the second type, like a proxy.

In other words, the invention concerns a signaling switching entity between the network of the first type and the network of the second type. In one embodiment this signaling switching entity is located near the transition between an RSVP aware network corresponding to the first network type and an MPLS network corresponding to the third network type. That entity can be denoted RSVP-MPLS proxy. Hereby, the receiver side should not necessarily be RSVP-capable, and in general, should not necessarily communicate with the MPLS network via the IP protocol.

Further advantageous embodiments are apparent from the respective dependent claims.

BRIEF DESCRIPTION OF THE DRAWINGS

Embodiments of the invention are described in text form hereinafter and are illustrated with drawings, which show in:

FIG. 6 the format of the TSPEC object;

FIG. 7 the format of the FLOWSPEC object for Guaranteed Service; and

DETAILED DESCRIPTION OF PREFERRED EMBODIMENTS

Figure 1:
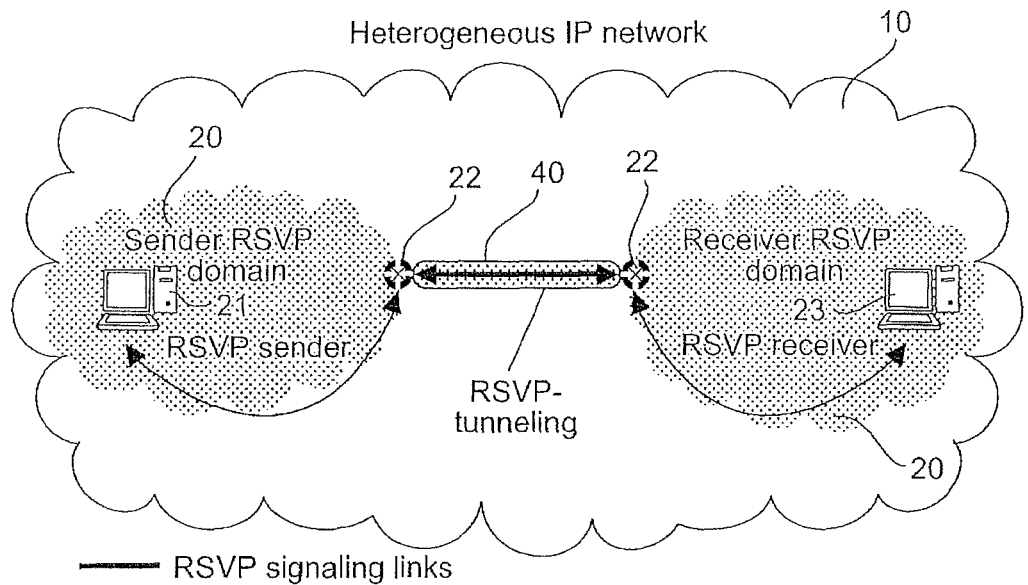
FIG. 1 the conventional tunneling of RSVP-controlled QoS over non-RSVP-capable networks.
Figure 2:
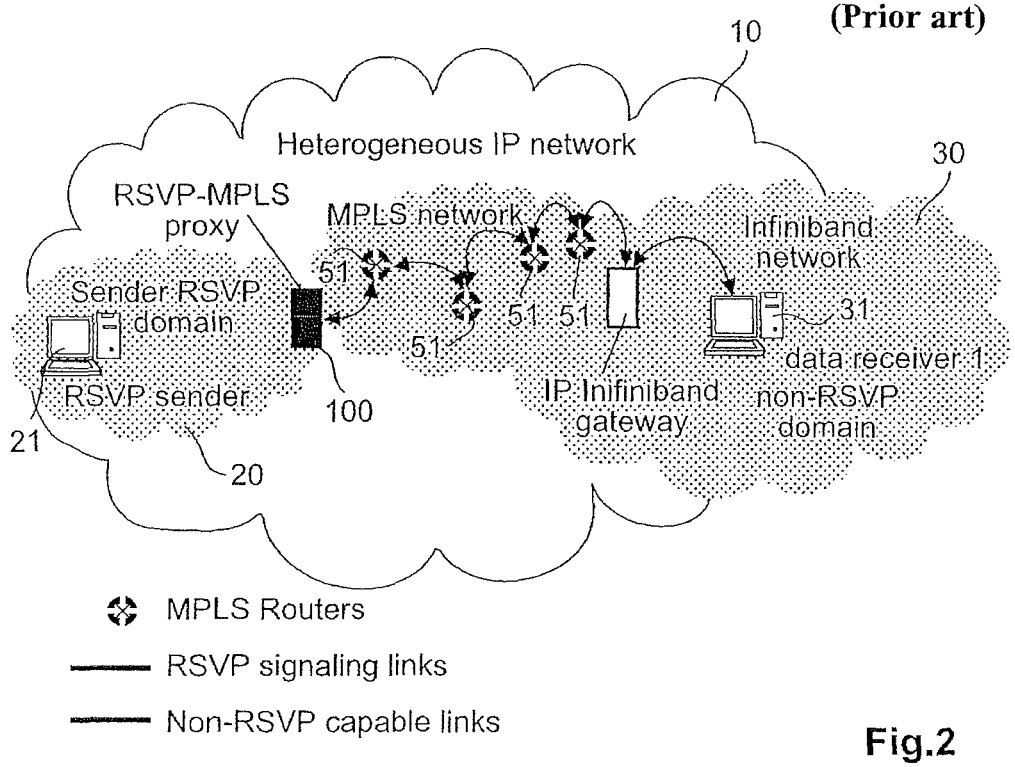
FIG. 2 a network architecture with an Infiniband-based receiver.
Figure 3:
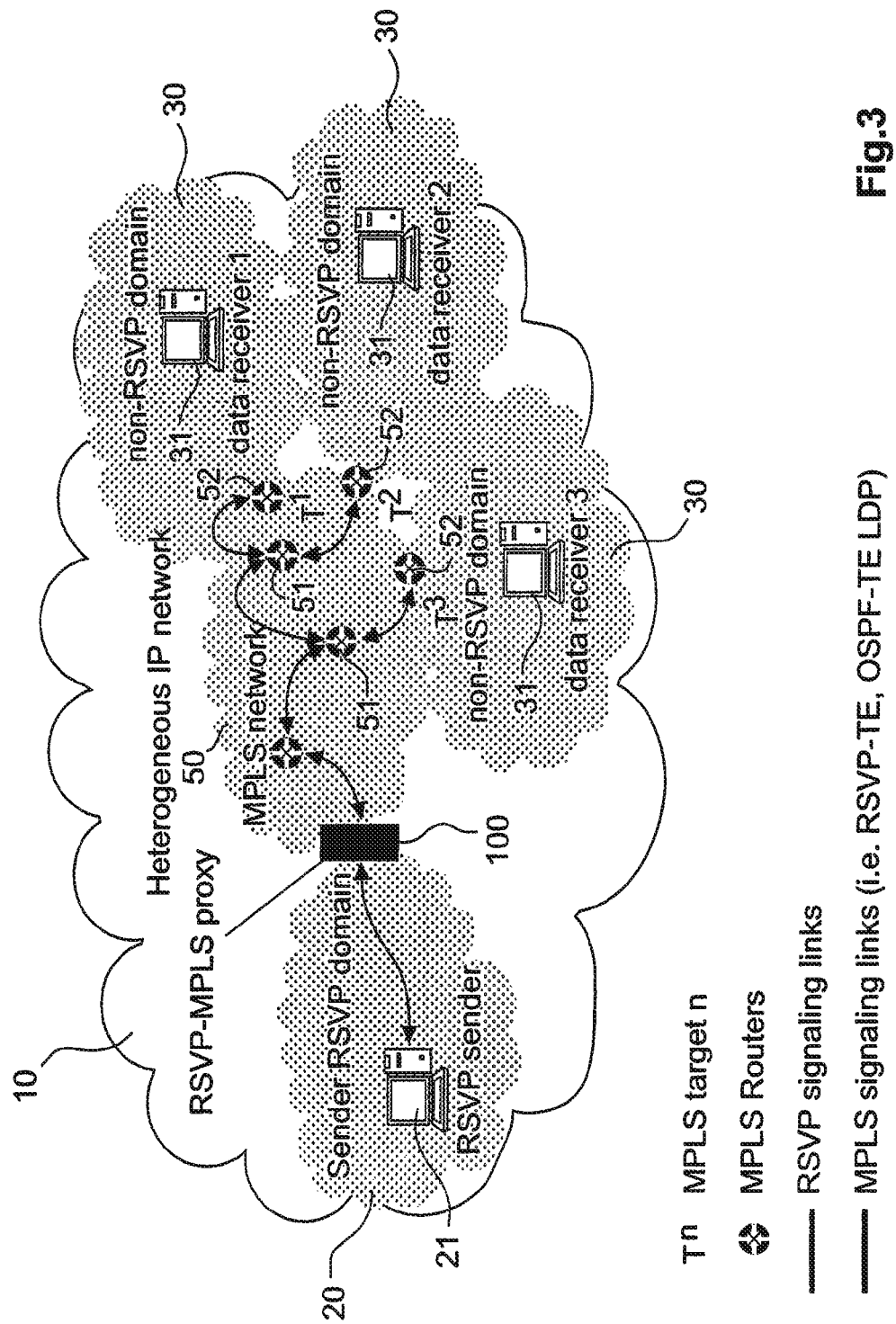
FIG. 3 a network architecture according the invention with an RSVP-MPLS proxy.

FIG. 2 and FIG. 3 show two examples of networks in which the RSVP-MPLS proxy according the invention is used. Known reference numbers in these drawings correspond to the same components as explained in the description of FIG. 1 above.

It is proposed to integrate an RSVP-MPLS proxy 100 within the signaling path between an RSVP data sender 21 of a customer IP network and an MPLS network 50 of a network operator. In FIG. 2 the RSVP-MPLS proxy is positioned at the border between the RSVP domain 20 and the MPLS network 50. The RSVP domain 20 includes a sending station 21. It is assumed that the sending station needs to communicate with a receiving station 31 in a network of an another location. This other network is considered to be a non-RSVP domain. In FIG. 2 an InfiniBand network 30 is taken as an example for the network of the other location. This uses a bidirectional serial bus system having a data transfer capacity of up to 16 GBit/s in each direction. The MPLS network between the two locations extends over a wide area of the Internet. Therefore, the messages transmitted by the sending station 21 will be routed from one router 51 to the other in the MPLS network 50 until the message finally reaches the gateway 60 at the border between MPLS network 50 and non-RSVP domain 30.

The example shown in FIG. 3 shows three non-RSVP domains 30 at the receiving end. The company/organization has 4 different sites with one or more domains at each site.

A predefined set of allowed targets $S^T = \{T_1, \ldots, T_m\}$ within an non-RSVP capable domain as well as a set of QoS descriptions $S^D = \{D_1, \ldots, D_n\}$ must be negotiated between the customer connected to the MPLS network 50 and the MPLS network operator. The customer can establish an MPLS connection to one or many targets from the set $S^T$ with a desired QoS chosen from the set $S^D$ for each target, whereas the range of services applicable to each target may also depend on the QoS capabilities of the receiver side. Assuming that the MPLS network 50 delivers QoS to a particular target according to a QoS description set identified by $S^{D(MPLS)}$ and the connected destination local network 30 supports QoS according to a set $S^{D(DestDomain)}$, the target QoS description set should be calculated as $S^{D(Target)} = \min(S^{D(MPLS)}, S^{D(DestDomain)})$. Whereby the set $S^{D(DestDomain)}$ can be implemented by a very simple QoS mechanism like overprovisioning or others. Each mentioned set is a multidimensional vector, so the min function has to be defined for each particular service. An example for the min function will be described in a section below. The network operator delivers MPLS transport services to the target according to the specified Service Level Agreements (SLA) negotiated in the QoS description $S^{D(MPLS)}$.

The invention presents a network device called "RSVP-MPLS proxy" (subsequently abbreviated as "proxy"). This proxy will be interposed into the signaling path between the RSVP-aware domain and the MPLS network. The RSVP signaling, used semantically similar to the IntServ architecture, will be terminated at the proxy 100. On reception of a flow description within a PATH message from the sender 21, the proxy will in the first step choose a suitable target from the set $S^T$ to reach the destination for that data flow. In the second step, the traffic description will be compared with each of the QoS descriptions from the set $S^D$ applicable to that target. Each QoS description contains a vector of QoS-related parameters the corresponding MPLS connection can be established with. An example for a QoS description within $S^D$ is shown in Table 1.

TABLE 1

QoS description example
MPLS description D1

| | |
|---|---|
| Maximum data rate, [bit/s] | 4000000000 |
| Maximum delay, [ms] | 30 |
| Maximum jitter, [ms] | 10 |
| Maximum packet loss | $10^{-7}$ |
| Minimum packet loss distance, [packets] | 1000 |

When a suitable QoS description is found, the proxy will establish the respective MPLS connection to the chosen target according to that QoS description. When the MPLS connection is established, an RSVP reservation towards the initiating RSVP host will be performed. If an MPLS connection to the chosen target is already in place, the proxy 100 will check if the desired traffic flow can be merged with other RSVP-reserved flows mapped to the same MPLS connection. In that case, the proxy will only perform an RSVP reservation to the initiating RSVP host on behalf of the receiver.

To enable a proper QoS mapping between the RSVP controlled and MPLS network, some basic calculation rules for QoS descriptions must be defined. With the sample MPLS description D, shown in Table 1, target components for operations min (minimum) and add (addition) should be calculated as follows:

min ($D_1$, $D_2$): min(Maximum data rate), max(Maximum delay), max(Maximum jitter), max(Maximum packet loss), min(Maximum packet loss distance).

add($D_1$, $D_2$): add(Maximum data rate), min(Maximum delay), min(Maximum jitter), min(Maximum packet loss), max(Maximum packet loss distance).

The also necessary comparison operators can be defined, using the min operation.

a) Two QoS descriptions are equal, if each component of the fist description is equal to the corresponding component of the second description.

b) Computation of the comparison operator less (<): $D_1 < D_2$ if $D_1 \neq D_2$ and $D_1 = \min(D_1, D_2)$.

For the proposed RSVP-MPLS proxy 100 according the invention, the following prerequisites should be met:

1. The network 20, the data sender 21 is residing on is fully or partly RSVP-capable and resource announcements and resource reservations are sent on behalf of the data sender. The proxy should be placed on the signaling path where IP packets carrying RSVP messages are passed through.
2. A Service Level Specification (SLS) between the RSVP domain operator and the MPLS network operator exists. Such an SLS specifies technical parameters of the Quality of Service level the network operator will provide.

The SLS should specify a set of QoS descriptions $S^D = \{D_1, \ldots, D_n\}$ with at least one QoS description in conjunction with a set of targets $S^T = \{T_1, \ldots, T_m\}$, MPLS connections can be established to. Not necessarily all targets should be reachable with all QoS descriptions $D_1$ to $D_n$, but at least with one from set $S^D$. Table 1 above shows an example of a QoS description. Table 2 below shows an example for a set of QoS descriptions, permitted to be used by particular targets for $S^T$ targets.

TABLE 2

Permitted QoS descriptions per target

| Target | Permitted QoS set |
|---|---|
| $T_1$ | $D_1, \ldots, D_n$ |
| $T_2$ | $D_1, D_2$ |
| $T_3$ | $D_1$ |
| ... | |
| $T_m$ | $D_3, D_n$ |

3. The MPLS network operator provides to the proxy means for on-demand initiation and control of MPLS connections with one of the predefined QoS descriptions from $S^D$. Such a mean can be the RSVP-TE protocol [RFC3209] or other traffic control architectures an MPLS network operator can implement—e.g. LDP, CR-LDP [RFC3212] or OSPF-TE [RFC3630].
4. The MPLS network operator accepts credentials of the proxy used by the user of the RSVP-aware domain for establishing the desired MPLS connections.

Figure 4:
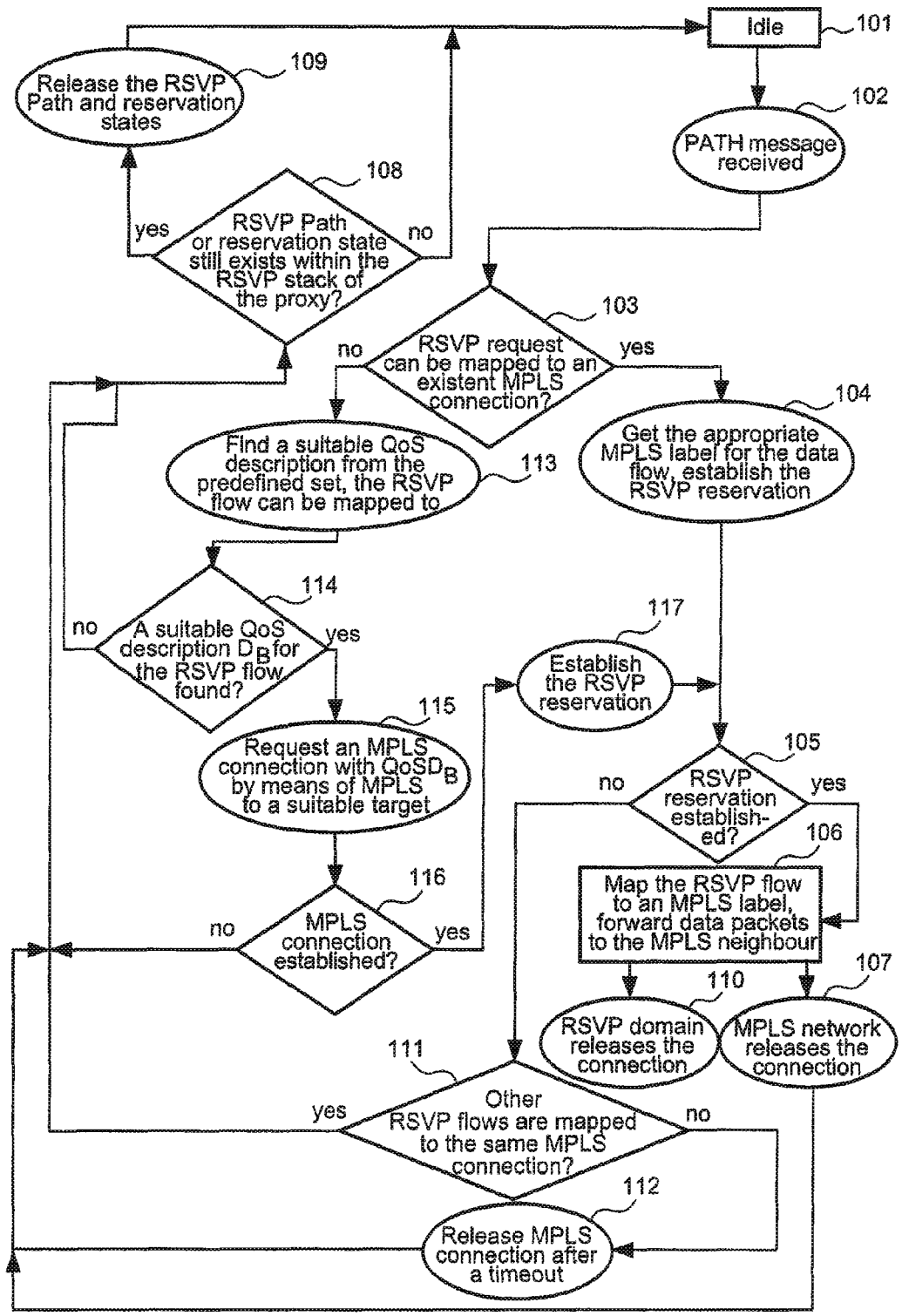
FIG. 4 a state diagram for the RSVP-MPLS proxy.

In compliance with these prerequisites, the RSVP to MPLS proxy 100 works as illustrated in the flow chart of FIG. 4:

In the idle state 101 the proxy 100 waits for an incoming PATH message from a permitted RSVP peer. On arrival of the PATH message, the proxy evaluates the PATH message in step 102.

Next, it needs to be checked which MPLS target from $S^T$ can be used to reach the receiver 31 of the PATH message. We denote that target $T_R$. This is done in step 103.

The process of determination of $T_R$ should be performed in two stages. Firstly, an MPLS peer can be determined by means of conventional IP routing. Secondly, the traffic specification of the RSVP message (TSPEC) should be mapped to the QoS description format on the MPLS side. The resulting QoS description of the sender $D_S$ will be compared with each QoS-description entry for that target (see Table 2). Generally, the RSVP flow will be mapped to the MPLS-side QoS description, best fitted to $D_S$. Best fitted means the minimal description (determined by operation min) not less than $D_S$. We denote the best fitted description from the set $S^D$ as $D_B$. If $D_B$ for the target $T_R$ doesn't exist, alternative routes by sophisticated IP routing methods can be considered. If there is no route within the MPLS network, with an big enough QoS description, no reservation towards the sender will be initiated. In this case the process proceeds further to step 113. Additionally, a PATH_ERROR message with error code "21" (Traffic Control) in conjunction with a vendor specific reason code can be sent towards the sender 21. In case of the PATH_ERROR the application can faster react to the service denial from the MPLS network.

In the step 103, the proxy looks up for an already established MPLS connection to the chosen target $T_R$. The proxy 100 has to track the sum of resources, consumed by all already established RSVP reservations, mapped to each established MPLS connection. Hereby, the traffic specification from the TSPEC object of the PATH message must be mapped into a QoS description format. The QoS description of the overall resources consumption can be calculated by the operation add described above. The overall resource consumption of all senders to a particular MPLS target is called in this document $D_{overall}$.

If an established connection exists, the step 104 follows in the flow chart. The proxy 100 first gets the MPLS label for the data flow. Further, the proxy will test in this step, if the QoS description of the requested flow $D_S$, extracted from the PATH message, added to $D_{overall}$ fits into the corresponding QoS description. That means: there exists an entry $D_B$ in the row for the target $T_R$ where the equation is true:

$$add(D_{overall}, D_S) \leq D_B.$$

In this case, a resource reservation with the announced traffic parameters will be sent towards the RSVP sender 21.

In interrogation 105 it will be confirmed, if the RSVP reservation is maintained.

All successive data packets belonging to that RSVP reservation will be passed to the associated MPLS connection by means of MPLS. This happens in step 106. Details about the mapping of RSVP flows into MPLS connections are described below in this document.

If one of the two tests performed in step 103 is negative, see above, the traffic specification of the PATH message will be mapped to an appropriate QoS description from the set $S^D$ and an MPLS connection corresponding to that description will be initiated. This is performed in step 113. A suitable QoS description $D_B$ will be searched in step 114 and if that has been found, the proxy 100 requests an MPLS connection with QoS description $D_B$ from the next router 51.

If the MPLS connection fails, no resource reservation towards the data sender 21 will be initiated. This is checked in interrogation 116. As described above, an explicit PATH_ERROR can be sent back to the data sender 21. If the MPLS connection succeeds, an RSVP reservation with the traffic specification according to the specification, announced by TSPEC object of the PATH message will be sent towards the RSVP sender 21.

On the MPLS side, different signaling protocols can be used—e.g. RSVP-TE, CR-LDP or OSPF-TE. When MPLS establishes the MPLS connection, an RSVP reservation towards the RSVP sender will be performed in step 117. All the data packets belonging to the corresponding RSVP reservation will be passed to the corresponding MPLS connection (Step 106).

An established connection from an RSVP host to an MPLS node can be released on behalf of either the RSVP domain (including the RSVP sender 21) step 110 or the MPLS network 50, step 107. In both cases, a proper disconnect procedure within the complementary network topology has to be performed. A proper reservation or connection release must be done if the MPLS connection fails or the RSVP reservation towards the RSVP-sender couldn't be established, respectively. The disconnect procedure is divided in two parts. One concerns the disconnection of the MPLS connection, steps 111 and 112 and the other the disconnection of the RSVP PATH and reservation states, see steps 108 and 109. An important point to be mentioned is the test performed in step 111. Here, it is checked whether other RSVP flows are mapped to the same MPLS connection. If yes, the MPLS connection cannot be released and remains active. In this case, only the RSVP PATH and reservation states are released in steps 108 and 109.

In the described scenario, the proxy can simultaneously handle different RSVP reservations from the RSVP-aware network and manage on behalf of the RSVP senders the different MPLS egress points T1, T2, T3 and MPLS connections associated with those RSVP reservations.

In the following, further details on the MPLS connection establishment will be explained. In MPLS so called label switching routers (LSR) must agree on the meaning of the labels used to forward traffic between and through them. LDP is a protocol defined for label distribution inside an MPLS domain. Constraint-based routing LDP (CR-LDP) is an extension to meet Traffic Engineering requirements.

The LSR uses CR-LDP to establish Label Switched Paths (LSP) through an MPLS network. A Forwarding Equivalence Class (FEC) is associated with each created LSP. This FEC specifies which packets are mapped to that LSP.

Figure 5:
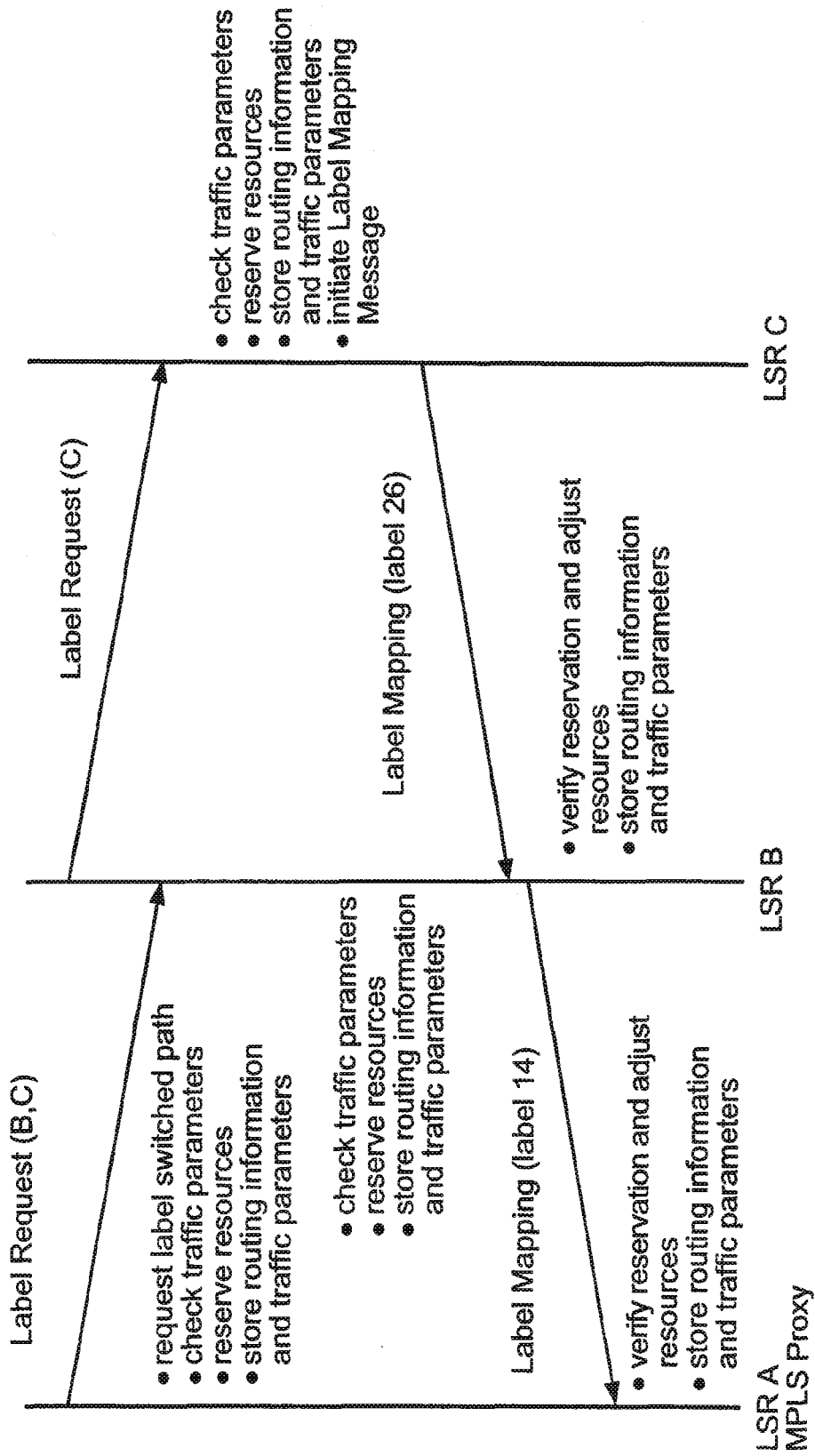
FIG. 5 CR-LDP Messages for Label Switched Path establishment.

Two LSR's (Label Switched Routers) which use CR-LDP to exchange label mapping information are known as LDP peers and they have an LDP session between them. In a single session, each peer is able to learn about the others label mappings. FIG. 5 shows the setup procedure for the establishment of a LSP between three LSR's A, B, C. The MPLS proxy 100 initiates the communication to the neighboring LSR B by sending a Label Request. LSR B forwards the request to the next neighbor LSR C. Both routers check the traffic parameters and reserve the corresponding resources when available. Label Mapping messages are sent upstream to the MPLS proxy for pending requests, signaling a successful establishment of the LSP. Each LSR verifies the reserved resources and readjusts the parameters if necessary, when a Label Mapping Message is received. Each LSR stores routing information (label in, label out, port) and traffic constraints (best-effort, guaranteed service, . . . ) in its database.

Now, further details on RSVP reservation are presented. The connection and reservation establishment using RSVP is somewhat more complicated than within MPLS networks. Especially, the resource reservation (the QoS connection establishment) according to RSVP should be initiated by the data receiver 31, not data sender 21. So, if a RSVP sender 21 intends to send data to an RSVP receiver using QoS support, it only advertises a data flow to the receiver using a PATH message. Amongst other objects, the PATH message contains an TSPEC object. The TSPEC object describes the traffic flow, the sender intends to send. The overall structure of the TSPEC object is shown in FIG. 6.

The real resource reservation should be requested by the RSVP receiver 31 with an RESV message. In the described scenario according the invention, the receiver 31 is in a non-RSVP domain. According to the invention, the RSVP-MPLS proxy 100 will request the resource reservation on behalf of the data receiver 31. The traffic parameters of the reservations are described within a FLOWSPEC object. The format of the FLOWSPEC object is depicted in FIG. 7. It is noted, that the shown formats for TSPEC and FLOWSPEC can be redefined for new RSVP-based services. In general, it is up to the receiver to reserve a flow description different from those described within the PATH message. However, for the described proxying scenario, it makes sense to constrain the traffic description of the RSPEC to that one of the corresponding TSPEC.

For clarification of mechanisms for RSVP flow merging, a merging example will be described, hereinafter. In general, the flow description of RSVP messages (the TSPEC object within the PATH message as well as FLOWSPEC within the RESV message respectively) are much more detailed than the QoS descriptions of MPLS connections, agreed between the RSVP and MPLS network operators. Table 3 shows an example of a QoS description set for an MPLS target. We suppose, the sender starts a request to a destination, reachable via that MPLS particular target. The proxy 100 can establish connections to targets only with one of the QoS descriptions $D_1$, $D_2$ or $D_3$.

TABLE 3

An example for a QoS description set for a particular MPLS target

| Description index | Maximum data rate | Maximum delay | Maximum Jitter | Maximum packet loss |
|---|---|---|---|---|
| $D_1$ | 1 Gbit/s | 250 ms | 30 ms | $10^{-9}$ |
| $D_2$ | 3 Gbit/s | 110 ms | 30 ms | $10^{-9}$ |
| $D_3$ | 10 Gbit/s | 60 ms | 30 ms | $10^{-9}$ |

Figure 8:
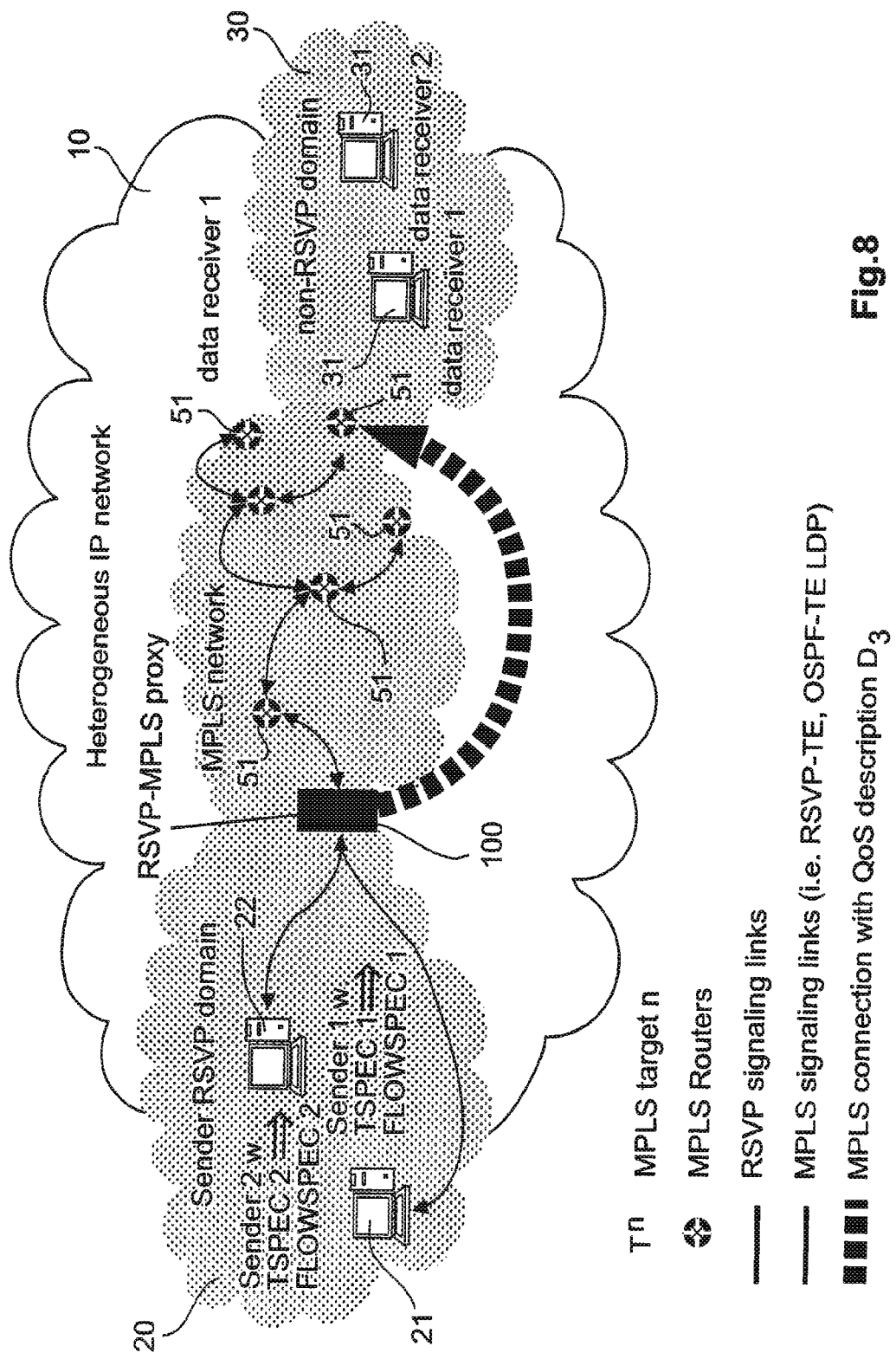
FIG. 8 an example for flow merging towards the MPLS network.

It is assumed that the first RSVP reservation between the Sender 21 and the proxy 100 has already been established, see FIG. 8. That means, Sender 1 sent an RSVP PATH message containing TSPEC 1 towards the proxy and the proxy has sent an RESV message containing FLOWSPEC 1 back towards Sender 1, with the traffic parameters of FLOWSPEC 1 (see Table 4) equal to those of TSPEC 1.

TABLE 4

Flowspec traffic parameters for the first RSVP reservation
FLOWSPEC 1

| | |
|---|---|
| Maximum data rate | 1.567 Gbit/s |
| Data rate | 1.5 Gbit/s |
| Maximum delay | 100 ms |
| Maximum jitter | 40 ms |
| Maximum packet loss, [%] | $10^{-8}$ |

Due to the constraint of the maximum delay to 100 ms, this RSVP flow was mapped to an MPLS connection with QoS description $D_3$. Now, an RSVP PATH message from Sender 2 to a receiver, reachable via the same MPLS target $T^2$, with the TSPEC 2 equal to TSPEC 1 arrives at the proxy 100. TSPEC 1 and TSPEC 2 will be mapped to the QoS description format and added together. The resulting description fits into the description $D_3$, so an RSVP reservation towards the Sender 2 with FLOWSPEC 2, containing traffic parameters equal to those of TSPEC 2, will be done. The resulting usage of the MPLS tunnel in terms of MPLS QoS description will be calculated and tracked down. The calculated resource usage $D_{overall}$ for the established MPLS tunnel is shown in Table 5.

TABLE 5

The QoS description of the MPLS tunnel usage
$D_{overall}$

| | |
|---|---|
| Maximum data rate | 3.134 Gbit/s |
| Maximum delay | 60 ms |
| Maximum jitter | 30 ms |
| Maximum packet loss, [%] | $10^{-9}$ |

Within the RSVP specification, flows belonging to a particular RSVP connection are identified by the following identifiers: ID={sender IP address, receiver IP address, sender port, receiver port, protocol IP (TCP or UDP)}. IP packets with the particular ID belong to an RSVP reservation as long as the RESV state within the node is valid. MPLS provides an additional encapsulation of data packets into an MPLS frame with a local scope tag, assigned to the particular MPLS connection. So the proxy must maintain a table with RSVP ID to MPLS label associations. Each IP packet with the RSVP ID will be mapped into a MPLS frame with a label, assigned to that node for the particular MPLS connection.

At last, a list of the cited Request for Comments documents is given:

| RSVP Nr. | Title |
|---|---|
| RFC2205 | Resource ReSerVation Protocol (RSVP) |
| RFC2379 | RSVP over ATM Implementation Guidelines |
| RFC2746 | RSVP Operation Over IP Tunnels |
| RFC2998 | A Framework for Integrated Services Operation over DiffServ Networks |
| RFC3031 | Multiprotocol Label Switching Architecture |
| RFC3107 | Carrying Label Information in BGP-4 |
| RFC3175 | Aggregation of RSVP for IPv4 and IPv6 Reservations |
| RFC3209 | RSVP-TE: Extensions to RSVP for LSP Tunnels |
| RFC3212 | Constraint-Based LSP Setup using LDP |
| RFC3630 | Traffic Engineering (TE) Extensions to OSPF Version 2 |

What is claimed is:

1. Method of transferring data between a sending station in a first network of a type of a Resource Reservation Protocol (RSVP) capable network and a receiving station in a second network of a type of a non-RSVP capable network, wherein the first and second network are connected over a third network of a type of an Multiprotocol Label Switching (MPLS) capable network, the method comprising terminating a signaling connection established inside the first network for controlling data transmission to the receiving station inside the second network performed by proxy means on behalf of the receiving station, said proxy means being located on a connection path at a border between the first network and the third network; and performing by said proxy means a Quality of Service mapping between a description $D_1$ of the Quality of Service demanded by the sending station and a description $D_2$ of the Quality of Service supported in the third network for data transfers directed to the receiving station, wherein for said mapping of the description $D_1$ of the Quality of Service demanded with the description $D_2$ of the Quality of Service supported in the third network, a comparison operation is performed to check if $D_1$ is lower than $D_2$ in the way: $D_1 < D_2$ if $D_1 \neq D_2$ and $D_1 = \min(D_1, D_2)$, and sending by the proxy means a resource reservation message back to the sending station on behalf of the receiving station if during the step of mapping a route has been found with a large enough Quality of Service description $D_2$;

wherein for a Quality of Service description in the form of MPLS description $D_1$ Maximum data rate, [bit/s]

Maximum delay, [ms]

Maximum jitter, [ms]

Maximum packet loss

Minimum packet loss distance, [packets]

a minimum operation is defined with $\min(D_1, D_2) := \min$(Maximum data rates), max(Maximum delays), max(Maximum jitters), max(Maximum packet losses), min(Maximum packet loss distances).

2. Method according to claim 1, further comprising:

choosing a target station inside the third network from which the receiving station in the second network can be reached; and comparing the demanded Quality of Service description from the sending station with the set of Quality of Service descriptions available for the target station.

3. Method according to claim 2, further comprising:
establishing a connection to the target station inside the third network with a Quality of Service from the set of available Quality of Service descriptions that is fitting to the demanded Quality of Service description from the sending station.

4. Method according to claim 2, further comprising:
checking the presence and load of an existing connection to the target station and if the existing connection has enough remaining capacity; and
occupying the needed capacity and directing any additional data flow into the existing connection.

5. Apparatus for controlling the data transfer between a sending station in a first network of a type of a Resource Reservation Protocol (RSVP) capable network and a receiving station in a second network of a type of a non-RSVP capable network, wherein the first and second network are connected over a third network of a type of an Multiprotocol Label Switching—(MPLS) capable network, wherein the apparatus comprises
    termination means being adapted to terminate on behalf of the receiving station a signaling connection established inside the first network for controlling data transmission to the receiving station inside the second network by proxy means,
    said proxy means adapted to perform a Quality of Service mapping between a description $D_1$ of the Quality of Service demanded by the sending station and a description $D_2$ of the Quality of Service supported in the third network for data transfers directed to the receiving station,
    wherein for the mapping operation of the description $D_1$ of the Quality of Service demanded with the description $D_2$ of the Quality of Service supported in the third network, a comparison operation is performed to check if $D_1$ is lower than $D_2$ in the way: $D_1 < D_2$ if $D_1 \neq D_2$ and $D_1 = \min(D_1, D_2)$,
    said proxy means further being adapted to send a resource reservation message back to the sending station on behalf of the receiving station if during the mapping operation a route is found with a large enough Quality of Service description $D_2$;
    wherein for a Quality of Service description $D_1$ in the form of
MPLS description $D_1$
Maximum data rate, [bit/s]
Maximum delay, [ms]
Maximum jitter, [ms]
Maximum packet loss
Minimum packet loss distance, [packets]
a minimum operation is defined with $\min(D_1, D_2) := \min$(Maximum data rates), max(Maximum delays), max(Maximum jitters), max(Maximum packet losses), min(Maximum packet loss distances).

6. Apparatus according to claim 5, wherein the termination means comprise means for selecting a target station in the third network from which the receiving station in the second network can be reached.

7. Apparatus according to claim 6, wherein the termination means further comprise comparing means for comparing a Quality of Service description from the demanding sending station with a set of Quality of Service descriptions available for the target station.

8. Apparatus according to claim 6, wherein the termination means comprise means for establishing a connection to the target station within the third network with a Quality of Service from the set of available Quality of Service descriptions that is fitting to the demanded Quality of Service description from the sending station.

9. Apparatus according to claim 7, wherein the termination means comprise means for establishing a connection to the target station within the third network with a Quality of Service from the set of available Quality of Service descriptions that is fitting to the demanded Quality of Service description from the sending station.

10. Apparatus according to claim 6, wherein the termination means comprise means for checking the presence and load of an existing connection to the target station in the third network and if the existing connection has enough remaining capacity, occupying the needed capacity and directing an additional data flow from the demanding sending station into the existing connection.

11. Method according to claim 1, wherein the second network is built based on Infiniband protocol.

12. Apparatus according to claim 5, wherein the second network is built based on Infiniband protocol.

13. The method according to claim 1, further comprising:
merging of a requested Quality of Service mapping between an RSVP-enabled network and MPLS network, with an existing data flow towards the target station over an established MPLS connection, wherein for said merging said proxy means makes use of the hash operation add (addition) on the two Quality of Service descriptions $D_1$ and $D_2$, in particular MPLS descriptions as follows:
add ($D_1$, $D_2$); add (Maximum data rate), min(Maximum delay), min(Maximum jitter), min(Maximum packet loss), max (Maximum packet loss distance).

14. The apparatus according to claim 5, wherein for a merging of a requested Quality of Service mapping between an RSVP-enabled network and MPLS network, with an existing data flow towards the target station over an established MPLS connection, said proxy means make use of the basic operation add (addition) on the two Quality of Service descriptions $D_1$, and $D_2$ in particular MPLS descriptions as follows:
add($D_1$, $D_2$): add(Maximum data rate), min(Maximum delay), min(Maximum jitter), min(Maximum packet loss), max(Maximum packet loss distance).

* * * * *